UNITED STATES PATENT OFFICE.

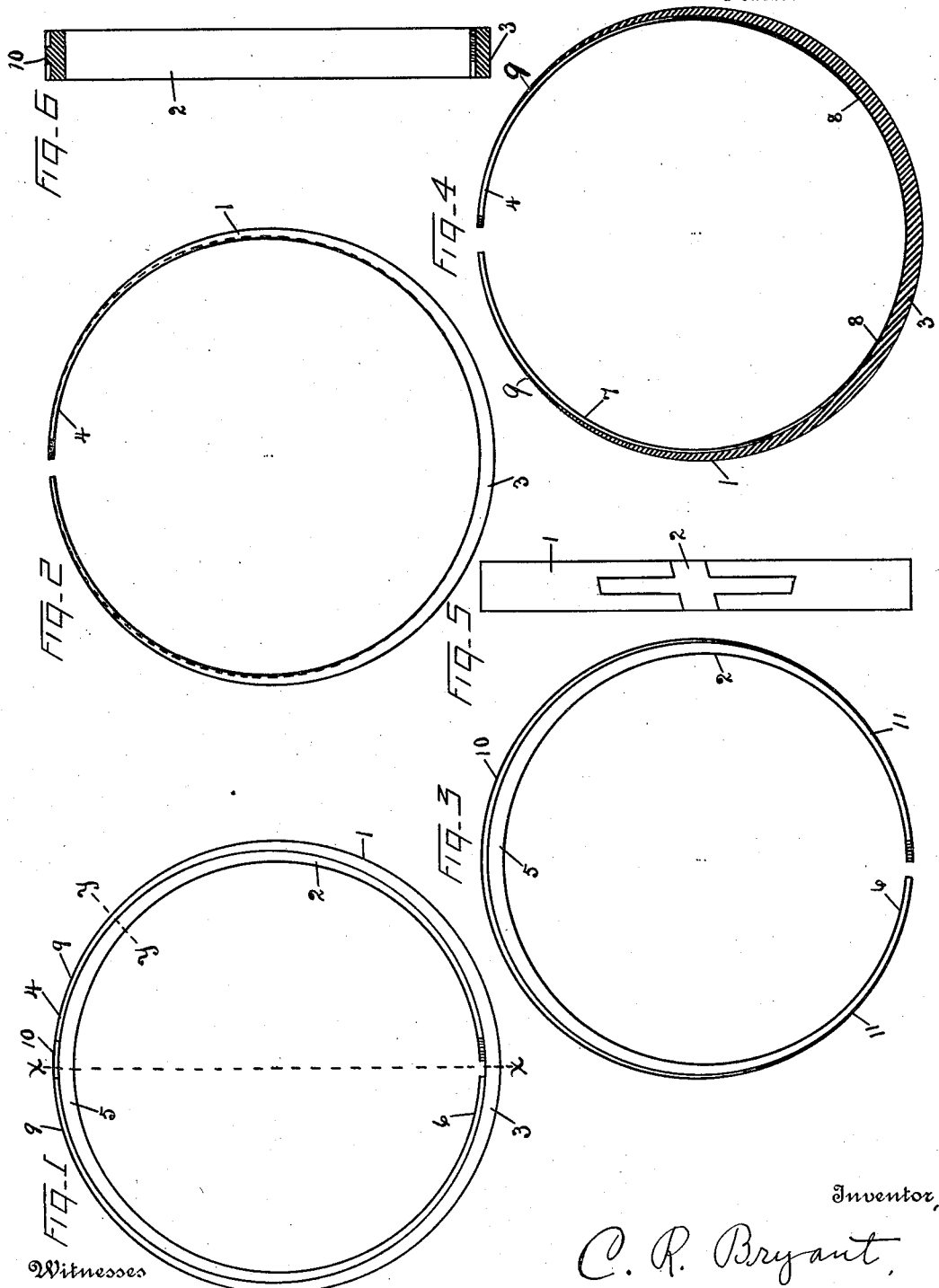
C. R. BRYANT.
PACKING RING FOR PISTON RODS.
APPLICATION FILED OCT. 26, 1914.
1,152,002.
Patented Aug. 31, 1915.
2 SHEETS—SHEET 1.

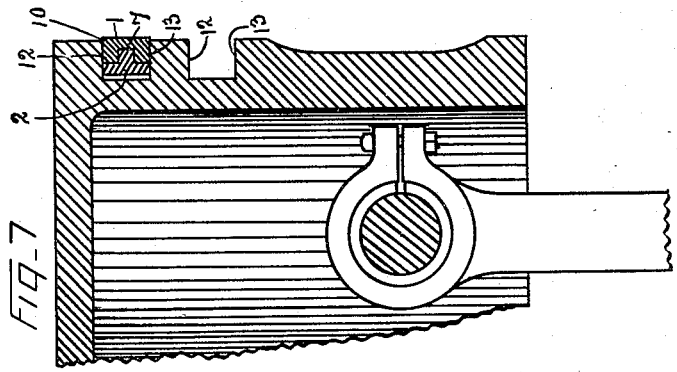
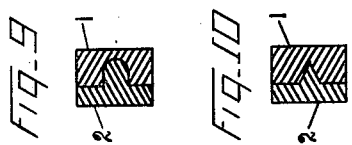
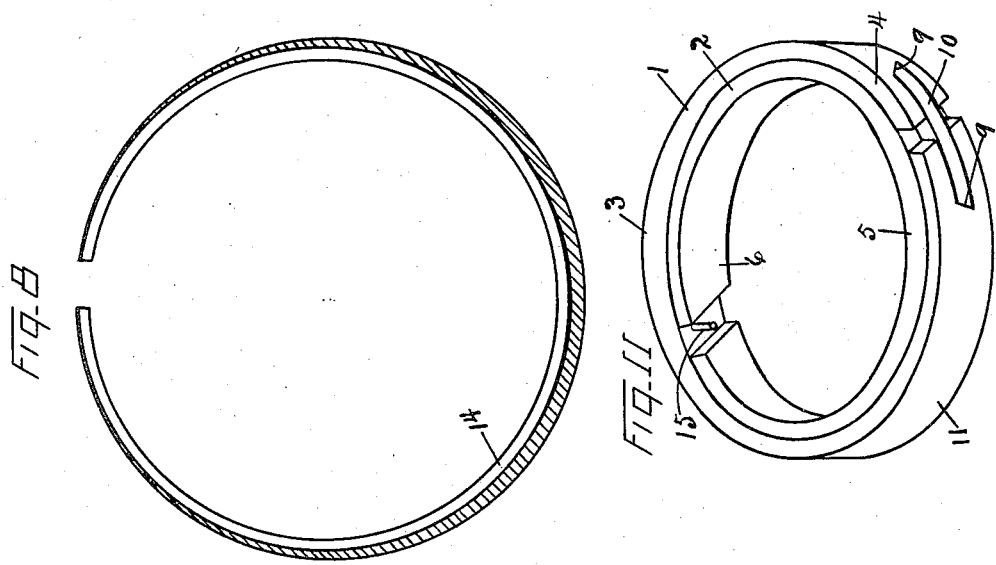
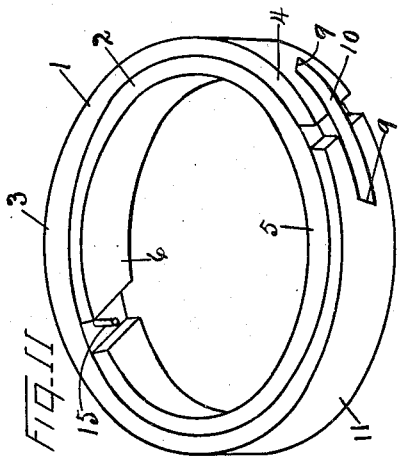

CLARANCE ROSS BRYANT, OF FORT WORTH, TEXAS, ASSIGNOR TO ROBERT W. COLGLAZIER, OF FORT WORTH, TEXAS.

PACKING-RING FOR PISTON-RODS.

1,152,002.            Specification of Letters Patent.      Patented Aug. 31, 1915.

Application filed October 26, 1914. Serial No. 868,572.

*To all whom it may concern:*

Be it known that I, CLARANCE R. BRYANT, a citizen of the United States, residing at Forth Worth, in the county of Tarrant and State of Texas, have invented certain new and useful Improvements in Packing-Rings for Piston-Rods, of which the following is a specification.

My invention relates to piston packing for steam or internal combustion engine pistons, and the object is to provide perfect packing expansible rings for pistons so that there can be no leaking of steam or explosive force past the pistons and to provide a continuous packing surface on the exterior surface of the packing ring, that is, between the packing ring and the piston cylinder, and also on both sides of the packing ring, top and bottom, between the edges of the packing ring and the walls of the groove in the piston so that there is a double check against the passage of steam or other element and to provide packing rings in which there will be automatic expansion of the rings.

Other objects and advantages will be fully explained in the following description and the invention will be more particularly pointed out in the claims.

Reference is had to the accompanying drawings which form a part of this application.

Figure 1 is a plan view of the complete packing ring. Fig. 2 is a plan view of the exterior packing ring, showing by dotted outline the position of the interior groove. Fig. 3 is a plan view of the interior packing ring, showing the exterior rib. Fig. 4 is a section, taken through the groove of the exterior packing ring. Fig. 5 is an edge view of the complete packing ring. Fig. 6 is a section taken along the line x—x of Fig. 1. Fig. 7 is a broken section of a piston, showing a section of the packing ring applied thereto, the section of the packing ring being taken on the line y—y of Fig. 1. Fig. 8 is a plan view of an exterior packing ring in section through the interior groove thereof, similar to Fig. 4, but showing a variation in the interior groove. Fig. 9 is a cross-section of a packing ring showing a variation of the exterior rib of the interior packing ring. Fig. 10 is a similar section, showing another variation of the rib. Fig. 11 is a perspective view of the packing ring shown in Fig. 1.

Similar characters of reference are used to indicate the same parts throughout the several views.

The packing ring herein shown comprises two eccentric rings 1 and 2 which, when placed together in operative position, form a perfect concentric packing ring. The exterior ring 1 is thicker at 3 than it is at 4 and the interior packing ring 2 is thicker at 5 than it is at 6. The exterior packing ring 1 has an interior groove 7 which commences substantially at the points 8, commencing at the interior surface and becoming gradually deeper until the groove extends entirely through the ring 1 at the points 9. The interior ring 2 has an exterior rib 10 which occupies the groove 7 of the exterior ring 1 when the rings are placed in operative position. The rib 10 commences substantially at the points 11 and becomes thicker until the rib passes entirely through the exterior ring 1 at the points 9. The rings 1 and 2 are open rings to provide for expansion and the openings in the rings are placed preferably diagonally opposite each other. At the point where the ring 1 is open, the rib 10 of the interior ring forms a continuous peripheral surface for bearing against the piston cylinder and the ring 2 is not divided at this point. At the point where the ring 2 is divided the ring 1 is not divided. There is thus a continuous peripheral surface for bearing against the piston cylinder and continuous edge surfaces of the packing ring to bear against both the top 12 and bottom walls 13 of the groove in the piston. A perfect check is formed by the two members of the packing ring, both on the periphery and on the edges of the packing ring.

The ring above described may be the preferred form of packing, but it is apparent that variations may be made without departing from my invention. The groove in the exterior member may be uniform in depth around the entire member, as the groove 14 shown in Fig. 8, of the drawings. The outer edge of the rib of the interior packing member may be rectangular, as shown in Figs. 7 and 11, or curved, as shown in Fig. 9, or V-shaped as shown in Fig. 10. Various changes may be made in the dimensions also in thickness and width of the rings.

The advantage of making the members 1 and 2 eccentric is that the thin portion of one member is placed opposite the thick portion of the other and the pressure in the piston cylinder is thus equalized, the expansion of one packing member equalizing the expansion of the other packing member.

In order to prevent the possible peripheral movement of one packing member on the other, a dowel pin 15 may be inserted in the outer member 1 to project in the opening of the interior member 2. Lateral movement of the packing members is prevented by the rib of the interior member projecting into the groove of the exterior member.

What I claim, is,—

1. A packing ring comprising exterior and interior eccentric open packing members, the interior packing member having an exterior rib on the thicker portion tapering and disappearing near the opening in said member and bridging the opening in the exterior member and said exterior member having a groove commencing near the thicker portion and growing deeper toward the opening therein and extending therethrough near the opening and said groove receiving the rib of the interior member.

2. A packing ring composed of exterior and interior packing members, the exterior member being eccentric and open and having the thicker portion thereof opposite the opening therein and an interior groove therein commencing near the thicker portion and becoming deeper until it projects through the outer surface thereof, and the interior member being open and eccentric and having a rib filling said groove and projecting through the exterior member and bridging the opening in said exterior member and forming a continuous peripheral packing surface with said exterior packing member.

In testimony whereof, I set my hand in the presence of two witnesses, this 19th day of October, 1914.

CLARANCE ROSS BRYANT.

Witnesses:
A. L. JACKSON,
J. W. STUT.